(12) United States Patent
Vilain

(10) Patent No.: US 6,205,877 B1
(45) Date of Patent: Mar. 27, 2001

(54) MODULAR DRIVE SYSTEM

(75) Inventor: Thomas Vilain, Velen (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/293,717

(22) Filed: Apr. 16, 1999

(30) Foreign Application Priority Data

Apr. 17, 1998 (DE) .............................................. 198 17 936

(51) Int. Cl.⁷ ...................................................... F16H 1/02
(52) U.S. Cl. ............................................ 74/413; 74/606 R
(58) Field of Search ................. 74/745, 606 R, 74/413

(56) References Cited

U.S. PATENT DOCUMENTS

| 1,785,798 | 12/1930 | Weiss . |
| 4,811,616 | 3/1989 | Henderson . |
| 4,951,527 | * 8/1990 | Klazura ............................... 74/606 R |
| 5,724,865 | * 3/1998 | Boone ................. 74/606 R |

FOREIGN PATENT DOCUMENTS

| 20 19 434 | 11/1971 | (DE) . |
| OS 20 19 434 | 11/1971 | (DE) . |
| 24 03 504 | 7/1975 | (DE) . |
| 26 49 949 | 11/1977 | (DE) . |

OTHER PUBLICATIONS

German publication VDI–Z, vol. 114 (1972), No. 2, pp. 122–129, entitled: "State and Tendencies in Development Relating to the Construction and Application of Geared Motors".

* cited by examiner

Primary Examiner—David Fenstermacher
(74) Attorney, Agent, or Firm—Henry M. Feiereisen

(57) ABSTRACT

A set of modular elements for the construction of a drive system, includes at least one main transmission, a motor unit, and a stepped sequence of subtransmissions mounted between the main transmission and the motor unit, whereby the subtransmissions are so configured that each subtransmission is connectable to the next smaller subtransmission and/or next greater subtransmission.

18 Claims, 3 Drawing Sheets

MODULAR DRIVE SYSTEM

CROSS-REFERENCES TO RELATED APPLICATIONS

This application claims the priority of German Patent Application Serial No. 198 17 936.7, filed Apr. 17, 1998, the subject matter of which is incorporated herein by reference.

BACKGROUND OF THE INVENTION

The present invention relates, in general, to a drive system, and more particularly to a set of modular elements for the construction of a drive system, including at least one main transmission, a motor unit, and a stepped sequence of subtransmissions mounted between the main transmission and the motor unit.

It is generally known to construct drive systems from transmissions and motors which are part of a modular kit, whereby the transmission may be composed of a main transmission and a subtransmission. Reference is made, for example, to an article in German publication VDI-Z, volume 114 (1972), No. 2, pages 122–129 and entitled "Stand und Entwicklungstendenzen bei der Konstruktion und Anwendung von Getriebemotoren" (*State and Tendencies in Development Relating to the Construction and Application of Geared Motors*). Although such a modular set allows construction of a great number of drive systems in a cost-efficient manner, the use of only relative few elements poses a problem when it comes to covering a wide range with respect to speed and torque.

German publication DE-OS 201 94 34 describes the combination of single transmissions in stretched arrangement, whereby a transmission is placed before a second transmission, i.e. to use two transmissions in series. Both transmissions typically include completely closed gear cases. Such an interconnection of separate single transmissions is cumbersome and expensive.

SUMMARY OF THE INVENTION

It is thus an object of the present invention to provide an improved drive system, obviating the afore-stated drawbacks.

In particular, it is an object of the present invention to provide an improved set of modular elements for the construction of a drive system, which is cost-efficient and covers with few elements a wide speed range and torque range, and thus enable a great number of combination possibilities.

These objects, and others which will become apparent hereinafter, are attained in accordance with the present invention by providing a modular drive system which includes at least one main transmission, a motor unit, and a stepped sequence of subtransmissions mounted between the main transmission and the motor unit, wherein the subtransmissions are so configured that each subtransmission is connectable to at least one of a next smaller and next greater subtransmission.

In accordance with the present invention, the subtransmission of the set can be combined amongst each other such that a sequence of subtransmissions can be realized in end-to-end disposition, to thereby construct together with a main transmission a gear train which satisfies the desired speed range and torque range.

Suitably, each subtransmission is of single-step configuration to ensure a great number of combinations, whereby each subtransmission includes a single gear shaft. This simplifies the construction. The variety of combinations can be further enhanced when aligning the gear shafts of all combined subtransmissions in a common plane in parallel relationship.

According to another feature of the present invention, the subtransmissions are mounted to one another in end-to-end disposition.

According to still another feature of the present invention, the drive system can be further simplified when the motor unit has an output shaft which extends in a common plane in parallel relationship to the gear shafts of the subtransmissions.

The use of a multiplicity of interconnected subtransmissions is especially simple when each subtransmission is connectable with a corresponding one of the stepped motor units, and when the output pinion of this motor unit and the output pinion of the subtransmission of the next smaller step are of a same size and occupy a same location when being installed.

The combination of drive system components can be simplified when designing the cases of the motor units, main transmissions and subtransmissions with complementary abutting end faces. Assembly can be further simplified when the interconnected cases of the subtransmission and the main transmission form a common gear case which defines a common interior space whereby the lateral attachment of a motor unit closes the interior space in the form of a lid. In this manner, a sealing of the gear case is simple to implement.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
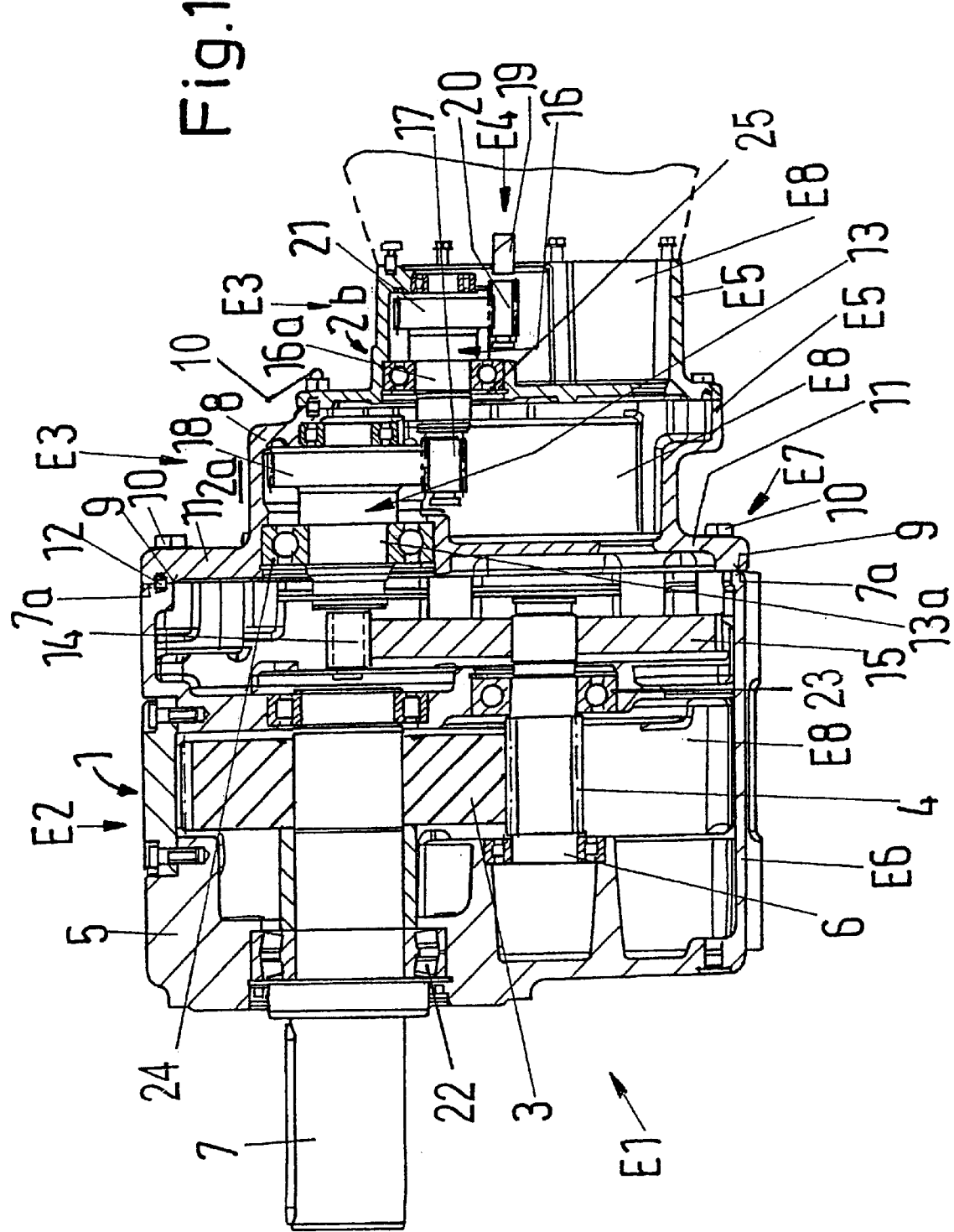
FIG. 1 is a sectional view of a drive system according to the present invention, comprised of a two-step main transmission and two subtransmissions.

Turning now to the drawing, and in particular to FIG. 1, there is shown a sectional view of an exemplified drive system according to the present invention, generally designated by reference numeral E1 and including a cascading power train which is composed of a two-step main transmission 1 forming a main transmission unit E2, a stepped sequence of two subtransmissions 2a, 2b which are of different size and form a subtransmission unit E3, and a motor unit E4 which closes off the main transmission distal side of the power transmission path in the form of a lid. The main transmission 1, the two subtransmissions 2a, 2b and the motor unit E4 are components of a set for the construction of drive systems with varying power trains. Thus, the set includes a plurality of main transmission units E2, at least one subtransmission unit E3 for each main transmission unit E2, and a plurality of motor units E4 for attachment to the respective end of the stepped sequence of transmissions that form the power train. The set includes for the subtransmission unit E3 a plurality of subtransmissions 2a, 2b etc. which are so configured that the subtransmission of each step is connectable to the subtransmission of the next smaller step and/or next greater step. Thus, except for the greatest subtransmission, i.e. the subtransmission that is immediately mounted to the main transmission 1 (subtransmission 2a in FIG. 1), and the smallest subtransmission that is immediately mounted to the motor unit E4, all intermediate subtransmissions between the greatest and smallest subtransmissions can only be mounted to the next greater one or the next smaller one. It is to be noted that for sake of simplicity the drive system E1 of FIG. 1 is shown only by way of two subtransmissions 2a, 2b to illustrate the principle of the present invention.

The subtransmission unit E3 and the main transmission unit E2 are mounted to one another such that their cases E5 and E6, respectively, are tightly connected to one another in end-to-end disposition to thereby form a common gear case, generally designated by reference numeral E7 and defining a common oil compartment E8, with the gear case E7 being closed off by the motor unit E4.

The main transmission 1 is constructed internally as two-step transmission, and has a gear case 5 which accommodates two meshing gear wheels 3, 4 of different diameter. The gear wheel 3 is mounted in fixed rotative engagement on a driven shaft 6 which is rotatably supported in the case 5, e.g. by roller bearings 22, whereas the gear wheel 4 is mounted in fixed rotative engagement on a driven shaft or layshaft 6 which is rotatably supported in the case 5, e.g. by ball bearings 23. On its driven shaft distant side, the gear case 5 has a flat end face 7a for lubricant-tight attachment of a confronting end face 9 of the case 8 of the subtransmission 2a so that the end face 9 is in flat engagement upon the end face 7a. The securement of the subtransmission 2a on the main transmission 1 is realized by screw fasteners 10 which are threadably engaged in aligned bores formed in the case 5 of the main transmission 1 and flange-like extensions 11 of the case 8. A precise positional alignment between the main transmission 1 and the subtransmission 2a is realized by a centering pin 12 which is received in aligned bores in the cases 5, 8. In like manner, centering pins 12 are used to realize the positional alignment between the subtransmissions 2a, 2b, and between the subtransmission 2b and the motor unit E4.

The one-step subtransmission 2a has a single driven gear shaft 13a which is rotatably mounted in the case 8, e.g. by ball bearings 24. The gear shaft 13a projects through a feedthrough opening into the main transmission 1 for support of an overhung mounted output pinion 14. The output pinion 14 is in mesh with an input gear wheel 15 of the main transmission 1, with the gear wheel 15 being mounted in fixed rotative engagement with the driven shaft 6.

A further reduction of the speed of the power transmission path is realized by the second subtransmission 2b, which represents the next smaller configuration of the subtransmission unit E3. The subtransmission 2b is secured by screws 10 to the subtransmission 2a at the side thereof distant to the main transmission 1, in a same manner as the attachment of the subtransmission 2a to the main transmission 1. Provided in the single-step subtransmission 2b is a driven gear shaft 16a which is rotatably mounted in the case 8, e.g. by ball bearings 25, and projects into the subtransmission 2a for support of an overhung mounted output pinion 17 which is in mesh with the input gear 18 of the subtransmission 2a.

Mounted to the subtransmission 2b is the motor unit E4 which, in the form of a lid, closes off the case 8 and thus the entire common gear case E7 with the common oil compartment E8. For sake of simplicity, the motor unit E4 is only illustrated by way of its output shaft 19 which supports an output pinion 20 for meshed engagement with the input gear wheel 21 of the subsequent subtransmission 2b.

Figure 2:
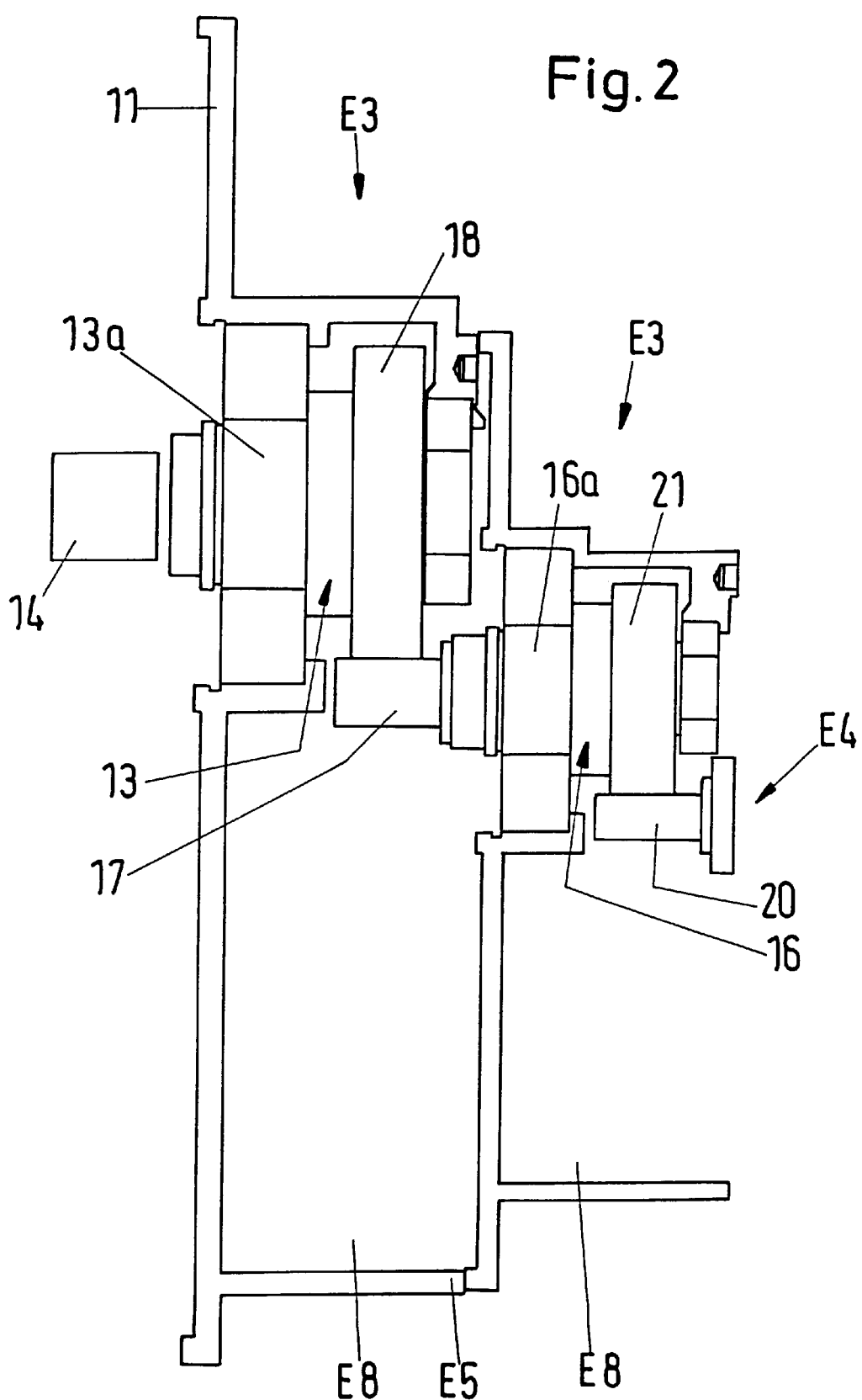
FIG. 2 is a schematic illustration of the subtransmission of FIG. 1.
Figure 3:
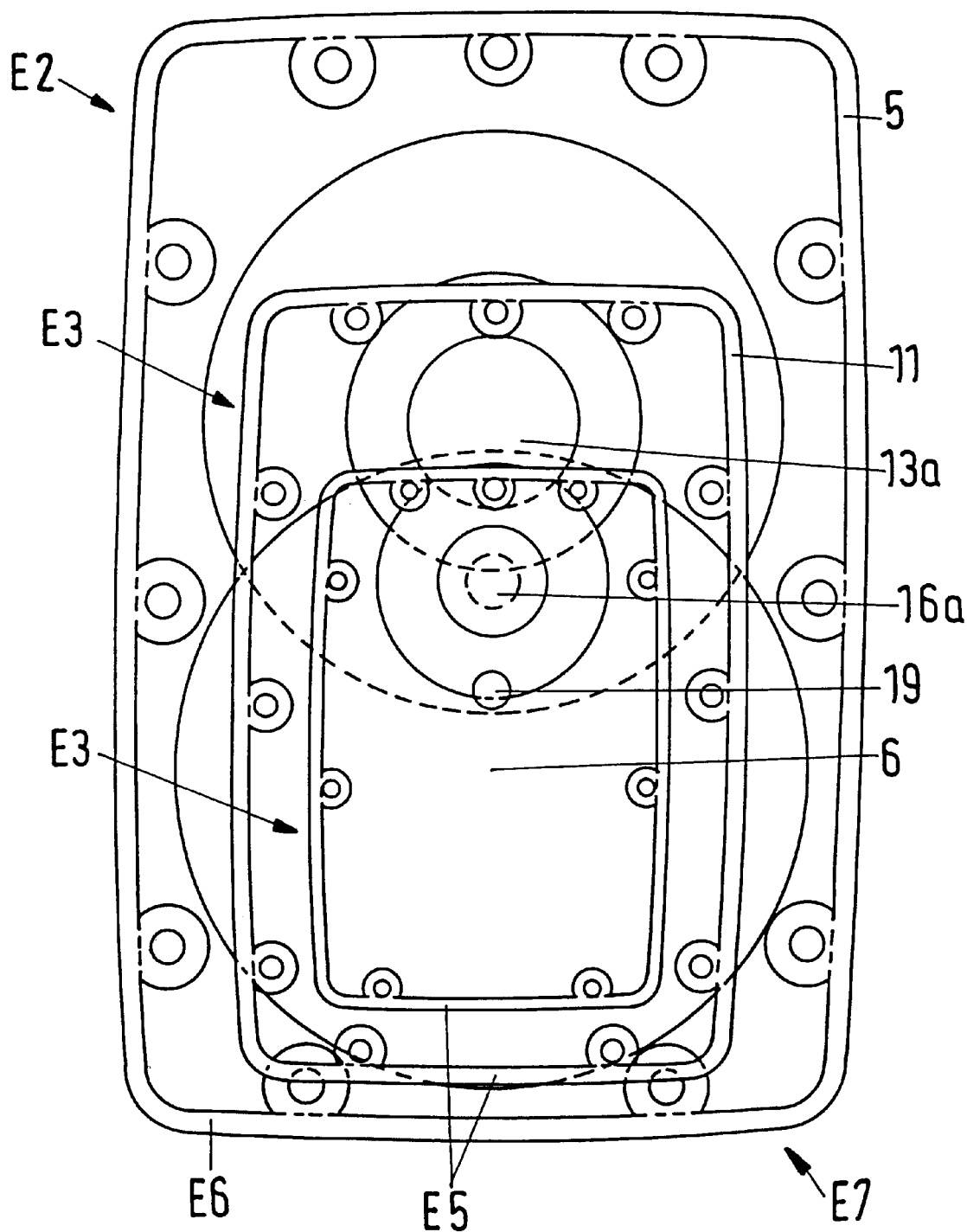
FIG. 3 is a schematic plan view of the drive system of FIG. 1

As shown in FIG. 1, all shafts 6, 7, 13a, 16a, 19 extend parallel to one another, and FIG. 3 shows that the driven shafts 13a, 16a of the subtransmission unit E3 and the driven shaft 19 of the motor unit E4 lie in a common plane. FIGS. 1 and 2 also show that the shaft 13a of the subtransmission 2a, the shaft 16a of the subtransmission 2b and the shaft 19 of the motor unit E4, are staggered in downward direction, like a cascade, transversely to their longitudinal extension or pivot axes and in opposition to the power flow direction towards the rear.

As stated above, the set of modular components for the construction of a selected drive system E1 includes a plurality of main transmissions 1, a plurality of subtransmissions 2a, 2b etc, and an array of motor units E4. In order to construct a desired drive system through attachment of a subtransmission unit E3 to the main transmission unit E2 and of a suitable motor unit E4 to the subtransmission unit E3, the output pinion 20 of the respectively selected motor unit E4 is of a same size as the output pinion of the subtransmission that could, optionally, be securable, instead of the motor unit E4, to the respective next greater subtransmission. Moreover, the output pinion 20 of the motor unit E4 and the output pinion of that subtransmission occupy a same location in the interconnected power train comprised of main transmission unit E2, subtransmission unit E3, and motor unit E4, when being installed.

While the invention has been illustrated and described as embodied in a modular drive system, it is not intended to be limited to the details shown since various modifications and structural changes may be made without departing in any way from the spirit of the present invention.

What is claimed as new and desired to be protected by Letters Patent is set forth in the appended claims:

1. A modular drive system, comprising:
   a spur-gear-type transmission unit including a plurality of main transmission modules of successively decreasing size, and a plurality of subtransmission modules of successively decreasing size, each subtransmission module being connectable to a corresponding one of the main transmission modules for defining a power train; and
   a plurality of complementary motor units;
   said transmission unit being configured that a one of the subtransmission modules is so connectable to a subtransmission module of at least one of a next smaller size and a next greater size that the transmission unit has a common oil compartment.

2. The drive system of claim 1 wherein each subtransmission module is of single-step configuration and includes a single gear shaft.

3. The drive system of claim 2 wherein in an assembly of subtransmission modules connected in sequence, the gear shaft of one subtransmission module extends in relation to the gear shaft of each other subtransmission module in a common plane and in parallel relationship to one another.

4. The drive system of claim 3 wherein the subtransmission modules are arranged in end-to-end relationship.

5. The drive system of claim 2 wherein in an assembly with at least one subtransmission module and a complementary motor unit, said motor unit has an output shaft which extends with the gear shaft of the at least one subtransmission module in a common plane and in parallel relationship to one another.

6. The drive system of claim 1 wherein each one of the motor units and each one of the subtransmission modules has an output pinion, each subtransmission module destined for combination with a corresponding one of the motor units, whereby the output pinion of the motor unit and the output pinion of the subtransmission of a next smaller size are of a same dimension and positioned at a same location when being installed.

7. The drive system of claim 1 wherein the main transmission modules, the motor units and the subtransmission modules have each a case, said cases of the main transmission modules, the motor units and the subtransmission modules having complementary end faces for attachment.

8. The drive system of claim 7 wherein the cases of the subtransmission modules form with the case of the main transmission module a common gear case which defines the common oil compartment which is closed by the motor unit in the form of a lid when the motor unit is laterally attached.

9. The drive system of claim 1 wherein the subtransmission modules are so sized as to fit within outer dimension of the main transmission modules in the power train when being installed.

10. A set of modular elements for the construction of a drive system, said set comprising a main transmission, a motor unit, and a plurality of subtransmission modules configured of successively decreasing size and intended for selective attachment between the main transmission and the motor unit for defining a power train, said subtransmissions being configured that a one of the subtransmission modules is so connectable to a subtransmission module of at least one of a next smaller size and a next greater size that the main transmission and connected ones of the subtransmission modules have a common oil compartment.

11. The set of claim 10 wherein each subtransmission module is of single-step configuration and includes a single gear shaft.

12. The set of claim 11 wherein in an assembly of subtransmission modules connected in sequence, the gear shaft of one subtransmission module extends in relation to the gear shaft of each other subtransmission module in a common plane and in parallel relationship to one another.

13. The set of claim 11 wherein in an assembly with at least one subtransmission module and a complementary motor unit, said motor unit has an output shaft which extends with the gear shaft of the at least one subtransmission module in a common plane and in parallel relationship to one another.

14. The set of claim 10 wherein the power train has at its input side the motor unit and at its output side the main transmission, with the motor unit being secured to a subtransmission module of smallest size in the power train, said motor unit having an output pinion which is of a same dimension as an output pinion of an optionally attachable subtransmission module of a next smaller size, whereby the output pinions of the motor unit and of the subtransmission module of the next smaller size are positionable at a same location in the subtransmission module of smallest size in the power train when being installed.

15. The set of claim 10 wherein the main transmission, the motor unit and the subtransmission modules have each a case, said cases of the main transmission, the motor unit and the subtransmission modules having complementary end faces for attachment.

16. The set of claim 15 wherein the cases of the subtransmission modules form with the case of the main transmission a common gear case which defines the common oil compartment closed by the motor unit in the form of a lid when the motor unit is attached.

17. The set of claim 10 wherein the subtransmission modules are arranged in end-to-end relationship.

18. The drive system of claim 9 wherein the subtransmission modules are so sized as to fit within outer dimension of the main transmission modules in the power train when being installed.

* * * * *